April 24, 1956  M. J. TOTH ET AL  2,742,976
PURIFIER

Filed July 17, 1953  2 Sheets-Sheet 1

INVENTORS
MICHAEL J. TOTH
DONALD R. SNOKE
BY
Hyde, Myers, Baldwin & Doran
ATTORNEYS April 24, 1956  M. J. TOTH ET AL  2,742,976
PURIFIER Filed July 17, 1953 2 Sheets-Sheet 2

INVENTORS
MICHAEL J. TOTH
DONALD R. SNOKE
BY
Hyde, Meyer, Baldwin & Doran
ATTORNEYS

United States Patent Office 2,742,976
Patented Apr. 24, 1956

2,742,976

PURIFIER

Michael J. Toth, Cleveland, and Donald R. Snoke, Bedford, Ohio, assignors to The V. D. Anderson Company, Cleveland, Ohio, a corporation of Ohio Application July 17, 1953, Serial No. 368,668

8 Claims. (Cl. 183—80)

This invention relates to novel and improved centrifugal separators of the non-rotative type for the removal of entrained material from fluid currents which in practical applications usually consist of gaseous streams such as air, steam, or the like. Our invention is applicable, for instance, in the removal of moisture droplets from boiler steam, or the removal of oil from exhaust steam. Other appropriate uses will immediately occur to those skilled in the art.

One of the objects of the invention is to provide a separator of the above type which is particularly useful as a line purifier.

A further object of the invention is to provide a separator as defined in the last preceding paragraph which is adapted for use in any of the three main positions, namely downflow, upflow, or horizontal.

A further object of the invention is to provide a separator as defined in the last preceding paragraph which can be manufactured relatively inexpensively from sheet metal material.

A further object of the invention is to provide a separator having a large primary separation chamber, and a secondary separation chamber capable of handling a large volume of liquid.

Other objects and advantages will be apparent from a study of the following specification, in conjunction with the accompanying drawings, in which.

Figure 1:
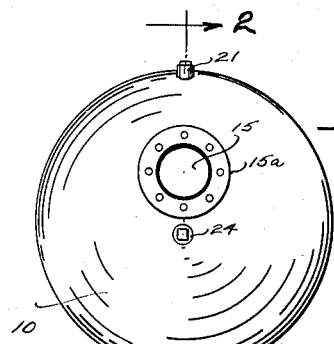
Fig. 1 is a view of our separator, in elevation.
Figure 2:
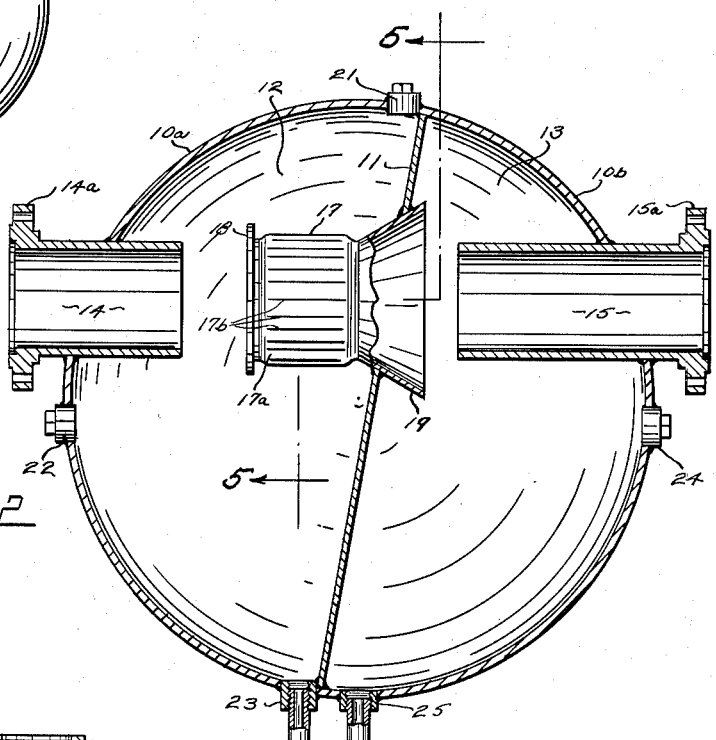
Fig. 2 is a view mainly in section, taken on the line 2—2 of Fig. 1, and somewhat enlarged, showing the separator in horizontal operating position.

Referring now to the drawings there is shown a separator comprising a generally spherical hollow housing 10 divided by a partition 11 to provide two chambers which are substantially identical in size and shape and which will be termed, for convenience, an inlet chamber 12 and an outlet chamber 13. The inlet chamber is defined by the substantially hemispherical wall 10a and the partition 11, the outlet chamber being similarly defined by the substantially hemi-spherical wall 10b and the partition 11. The walls 10a and 10b are welded along a line to the left of partition 11 (Fig. 2).

As will appear, the chamber 12 constitutes a primary separation chamber and the chamber 13 constitutes a secondary separation chamber.

Figure 5:
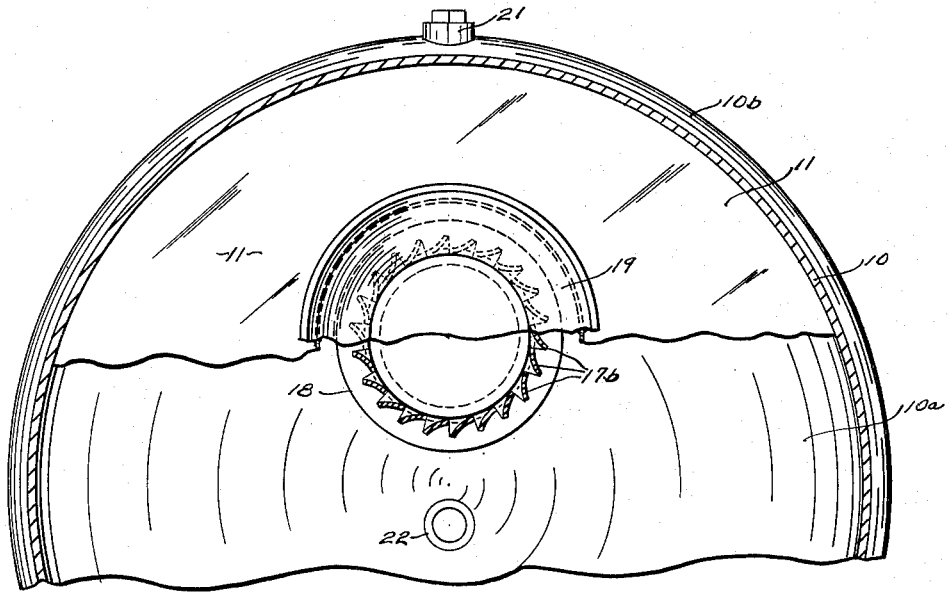
Fig. 5 is a view taken on the line 5—5 of Fig. 2, but somewhat enlarged.

An inlet port defined by a nozzle 14 having a connector flange 14a extends through wall 10a, partly within and partly without the inlet chamber 12, and an outlet port defined by a nozzle 15, also having a connector flange 15a extends through wall 10b, partly within and partly without the outlet chamber 13. Both said nozzles are in substantial axial alignment on respective sides of partition 11. Between said nozzles, and supported in an aperture in partition 11, is a whirl-promoting tuyere 17, closed at its left end (Fig. 2) by a plate 18, and having a frusto-conical flared lip 19 at its right end. As is customary, the tuyere has a cylindrical wall 17a having therein a series of slots 17b best seen in Fig. 5 which are conveniently formed by slitting the wall 17a and outwardly deforming an edge of each slot to provide a spaced series of louvers whereby a fluid stream such as steam entering through said louvers will have a vortical whirl imparted thereto.

As will be now apparent, when nozzles 14 and 15 are utilized to connect this separator in a steam line, the steam entering at 14 first impinges against plate 18, losing a portion of entrained droplets on said plate, which droplets coagulate and eventually drip downwardly within chamber 12. Further coagulation produces droplets as a result of the reduced velocity of the steam in the primary separation chamber. The steam next enters the slots 17b, acquiring a whirling motion as aforesaid and thereby further losing entrained moisture particles which, by centrifugal action, are deposited around the lip 19 and thereafter drip to the bottom of chamber 13. The whirling motion tends to distribute the stream of vapor around chamber 13 whereby the vapor loses a still further increment of entrained moisture on the inner surface of wall 10b and around nozzle 15. Eventually the purified steam leaves chamber 13 through nozzle 15.

For the purpose of removal of separated liquid from chambers 12 and 13 we have provided a plurality of strategically located drain couplings. In the inlet chamber, in the embodiment shown, they are identified by reference characters 21, 22, and 23 respectively, and in the outlet chamber by reference characters 24 and 25. In the separator orientation shown in Fig. 2 the drain couplings 23 and 25 are in open communication with respective pipes which may communicate with steam traps, not shown. The other drain couplings 21, 22, and 24 are closed by suitable screw plugs. Water or other fluent material separated from the fluid current will naturally drain by gravity through couplings 23 and 25.

Figure 3:
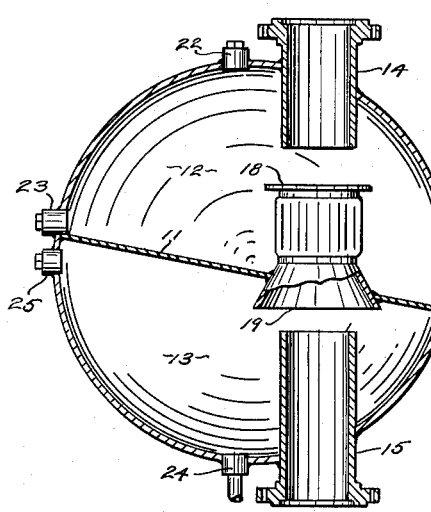
Fig. 3 is a view similar to Fig. 2 but somewhat reduced in scale, showing the separator in vertical position, for downflow operation.
Figure 4:
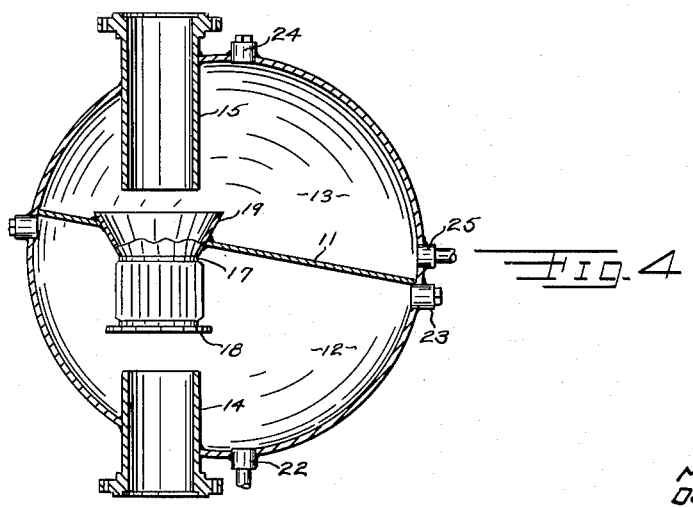
Fig. 4 is a view similar to Fig. 3, the separator being likewise in vertical position, but arranged for upflow operation.

It may now be observed, for the purpose of further discussion, that partition 11 intersects a diametrical plane within housing 10. The purpose of this will be apparent by reference to Figs. 3 and 4 wherein the common axis of the inlet and outlet nozzles is vertical, although in Fig. 3 the general direction of the fluid current is downwardly, while the general current direction in Fig. 4 is upwardly. The inclination of the partition in each of these two positions facilitates drainage of separated liquid in the upper chamber towards a suitable drain coupling. From a consideration of Figs. 2, 3 and 4 it appears that the number of drain couplings can be restricted to five while still providing a bottom outlet for each chamber in the three positions herein illustrated, and those three positions are sufficient to meet substantially all installation problems.

The spherical shape of the separator device here shown is best adapted to withstand pressure with a minimum section thickness of metal in the housing wall. This in turn makes the structure lighter and more economic to fabricate. The housing 10 may be assembled from two hemispherical cups which can be pressed or spun from suitable metal sheet or plate.

It may be observed, from an examination of Fig. 2 for example, that the nozzles 14 and 15 are disposed co-axially, and about an imaginary horizontal plane through the center of the housing 10. One advantage to this structure is that when the separator is used either in the position of Fig. 3 or Fig. 4 the respective drain outlets 24 and 22 will be at the lowermost points of respective chambers 13 and 12 in each instance.

It has heretofore been stated that the partition 11 was titled with respect to a diametrical plane within the housing 10. This partition is also inclined to a horizontal plane when the common axis of the nozzles is vertical, as shown in Figs. 3 and 4. In the preferred embodiment shown the axis of the tuyere coincides with said common axis of the nozzles.

From a consideration of the structure herein shown and described it will be apparent that separated material can be conducted downwardly to an outlet from all internal surfaces; that both the inlet and outlet chambers serve to collect liquid until drainage can be effected; that there are three specific stages of separation, namely (1) entrainment separation by impingement of the entrainment-carrying stream against baffle surfaces of the whirl-promoting element; (2) entrainment separation by gravitational settling resulting from reduced forward velocity of gas or vapor flow; and (3) entrainment separation by means of controlled centrifugal action.

What we claim is:

1. A purifying device for separating entrained material from a fluid stream, said device comprising a hollow, generally spherical housing, a partition within said housing whereby to define an inlet chamber on one side of said partition, and an outlet chamber on the other side of said partition, inlet port means providing an inlet passage into said inlet chamber, and outlet port means providing an outlet passage from said outlet chamber, said partition being flat, and being disposed in a plane inclined at an acute angle to a diametrical plane between said ports, said partition being provided with an orifice permitting fluid communication between said chambers, a whirl promoting tuyere disposed in said orifice for imparting a vortical motion to said fluid passing therethrough, and means for discharging separated material from each said chamber, said last-named means including three discharge couplings, two couplings in the wall of one chamber adjacent said partition but diametrically opposed to each other, and the other coupling in the wall of said other chamber adjacent said partition and adjacent one of the first said couplings.

2. A purifying device for separating entrained material from a fluid stream, said device comprising a hollow, generally spherical housing, a partition within said housing whereby to define an inlet chamber on one side of said partition, and an outlet chamber on the other side of said partition, inlet port means providing an inlet passage into said inlet chamber, and outlet port means providing an outlet passage from said outlet chamber, said partition being flat, and being disposed in a plane inclined at an acute angle to a diametrical plane between said ports, said partition being provided with an orifice permitting fluid communication between said chambers, a whirl promoting tuyere disposed in said orifice for imparting a vortical motion to said fluid passing therethrough, and means for discharging separated material from each said chamber, said last-named means including a first discharge coupling in the wall of said inlet chamber adjacent said inlet port, a second discharge coupling in the wall of said outlet chamber adjacent said outlet port, a third and a fourth discharge coupling in the wall of one said chamber near said partition but diametrically opposed to each other, and a fifth discharge coupling in the wall of the other said chamber adjacent said partition and adjacent one of the third and fourth said couplings.

3. A purifying device for separating entrained material from a fluid stream, said device comprising a hollow, generally spherical housing, a partition within said housing whereby to define an inlet chamber on one side of said partition and an outlet chamber on the other side of said partition, inlet port means providing an inlet passage into said inlet chamber said inlet port means consisting of a tubular inlet nozzle extending partly within and partly without said inlet chamber, outlet port means providing an outlet passage from said outlet chamber, said outlet port means consisting of a tubular outlet nozzle extending partly within and partly without said outlet chamber, said inlet and outlet nozzles having aligned axes, the common axis of said nozzles being spaced from a diametrical plane parallel thereto, said partition being provided with an orifice permitting fluid communication between said chambers, a whirl promoting tuyere disposed in said orifice for imparting a vortical motion to said fluid passing therethrough, and means for discharging separated material from each said chamber.

4. A purifying device as defined in claim 3 wherein the partition is disposed in a plane inclined at an acute angle to a plane perpendicular to the nozzle axes.

5. A purifying device as defined in claim 3 wherein the means for discharging separated material includes three discharge couplings, two couplings in the wall of one chamber adjacent said partition but diametrically opposed to each other, and the other coupling in the wall of said other chamber adjacent said partition and adjacent one of the first two said couplings.

6. A purifying device as defined in claim 3 wherein the means for discharging separated material includes a discharge coupling in the wall of the inlet chamber adjacent said inlet nozzle and another discharge coupling in the wall of the outlet chamber adjacent the outlet nozzle.

7. A purifying device as defined in claim 3 wherein the means for discharging separated material includes a first discharge coupling in the wall of said inlet chamber adjacent said inlet nozzle, a second discharge coupling in the wall of said outlet chamber adjacent said outlet nozzle, a third and a fourth discharge coupling in the wall of one said chamber near said partition but diametrically opposed to each other, and a fifth discharge coupling in the wall of the other said chamber adjacent said partition and adjacent one of the third and fourth said couplings.

8. A purifying device as defined in claim 3 wherein the means for discharging separated material includes a plurality of drain couplings spaced around the housing wall in the vertical axial plane of the nozzles, there being at least one such drain coupling in communication with each said chamber and adjacent the lowermost point thereof when the purifying device is disposed with the nozzle axis is in either a vertical or a horizontal position.

References Cited in the file of this patent

UNITED STATES PATENTS

| | | |
|---|---|---|
| 1,725,580 | Hawley | Aug. 20, 1929 |
| 1,765,918 | Hawley | June 24, 1930 |
| 1,775,362 | Demarcus | Sept. 9, 1930 |
| 1,931,194 | Hawley | Oct. 17, 1933 |
| 2,489,903 | Kraft et al. | Nov. 29, 1949 |
| 2,620,892 | Stover | Dec. 9, 1952 |